Jan. 12, 1926.

E. KEPPNER 1,569,549

AERIAL NAVIGATION TOY

Filed Jan. 17, 1925     2 Sheets-Sheet 1

Inventor:
Ernst Keppner

Jan. 12, 1926.

E. KEPPNER 1,569,549

AERIAL NAVIGATION TOY

Filed Jan. 17, 1925   2 Sheets-Sheet 2

Inventor:
Ernst Keppner

Patented Jan. 12, 1926.

1,569,549

UNITED STATES PATENT OFFICE.

ERNST KEPPNER, OF NUREMBERG, GERMANY, ASSIGNOR TO THE FIRM BLECHSPIEL-WARENFABRIK JOHANN DISTLER, OF NUREMBERG, GERMANY.

AERIAL-NAVIGATION TOY.

Application filed January 17, 1925. Serial No. 3,140.

*To all whom it may concern:*

Be it known that I, ERNST KEPPNER, a citizen of Germany, residing at Nuremberg, Bavaria, Germany, have invented certain new and useful Improvements in Aerial-Navigation Toys, of which the following is a specification.

Hitherto there are known devices and rope-way toys, in which overpulleys arranged on a surface runs in an intermittent manner, an endless cord provided with catch members, so that the cars being on the surface are engaged and taken along, the movement of the cord being obtained by hand.

The present invention has for its object a toy, in which at a certain height from the surface an airship is suspended and continuously moved over a geographical map, the movement being obtained by means of a spring mechanism driving one of the guide rollers over which runs an endless cord. In accordance with the structure of the toy not only an amusement for the children is obtained, but also the geographical representation of the surface of some portion of the earth is shown to them, for the purpose of serving simultaneously as a demonstrating appliance.

The example represents the last trip of the famous airship Zeppelin to America, the ground plate of the toy being shaped as a geographical map showing on the one hand the western part of the European Continent and on the other hand the eastern coast of the United States of America. On this map may if desired be shown the cities and principal rivers of each continent and the islands in the Atlantic Ocean. On this ground plate are provided at different places guide rollers corresponding to the places of departure and places of arrival respectively and which are fixed on rotating shafts projecting in an upward direction from the surface. These places are represented as buildings receiving the shafts, one of said shafts being driven by means of a spring mechanism. Around the rollers runs a cord, on which is suspended an airship, an aeroplane or the like.

The accompanying drawings shows by way of example the object of the present invention illustrating the last famous trip of the Zeppelin to the United States of America.

Figure 1:
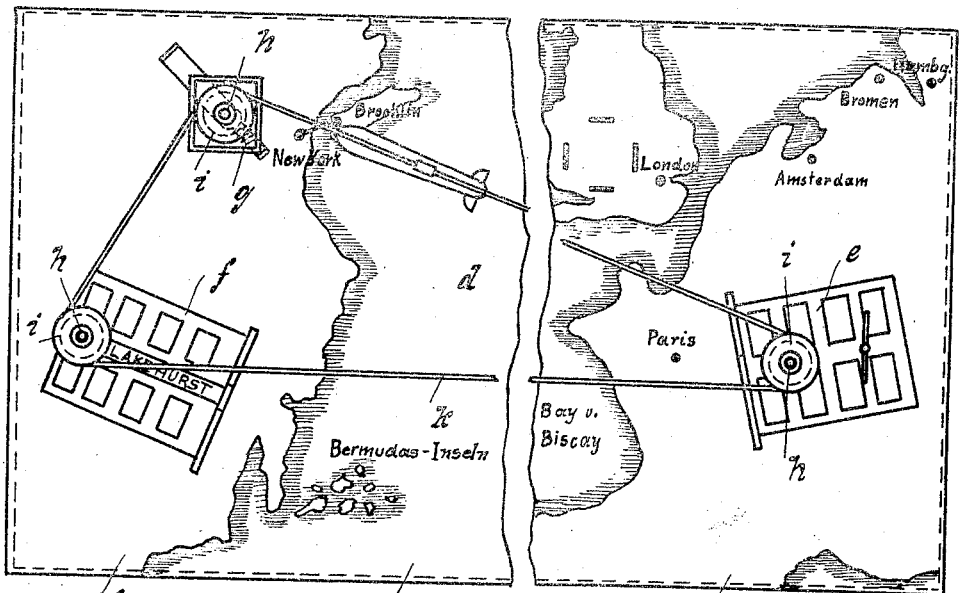
Figure 2:
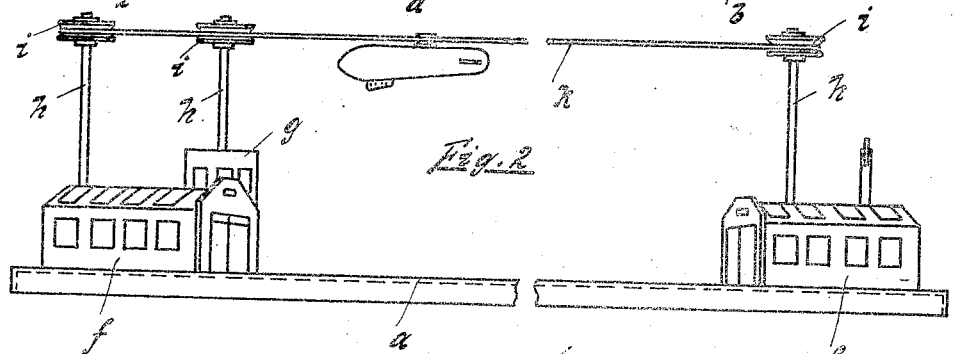

Fig. 1 is a plan view,

Fig. 2 a side elevation and

Figure 3:
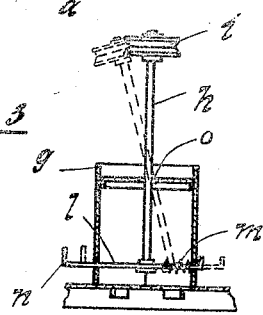

Fig. 3 a partly longitudinal section.

Figure 4:
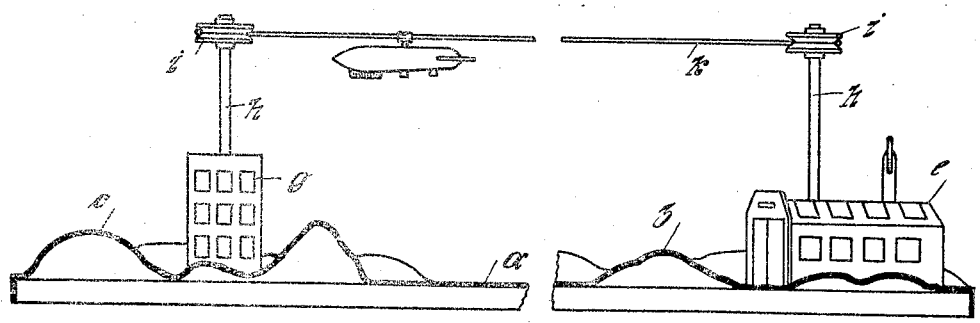

Fig. 4 is a longitudinal section of a form of modification showing the geographical map in relief.

The ground plate $a$ shows on a surface in a flat manner or also brought out in relief a geographical map, which represents at $b$ the western part of the European Continent and at $c$ the eastern coast of the United States of America, while at $d$ the Atlantic Ocean with the islands therein may be recognized. On the spots $e$, $f$, $g$ of the map are provided buildings representing for example airship hangars and sky scrapers, within which buildings are journaled shafts $h$ projecting upwardly and which support at the upper end guide rollers $i$, around which runs the cord $k$ with the airship fixed thereon. One of these shafts is driven by a spring mechanism, so that after winding up the latter the cord with the suspended airship is moved over the geographical map and so illustrates the itinerary of the trip of the Zeppelin to America.

To afford a permanent stretching of the cord $k$ one of the shafts of the rollers is journaled with its downward end in such a manner, that the support of the same is mounted slidably as shown in Fig. 3 of the annexed drawing. The shaft $h$ reposes with its downward end in the support $l$, which is mounted on a horizontally slidable bar and is held in its position by a spiral spring $m$. The shaft $h$ is guided near the middle in a bore $o$, so that the guide roller fixed upon the upward end is tiltable in an outward direction. This tilting arrangement of one of the shafts $h$ with the roller has the purpose, that the cord running around the rollers is held permanently in a stretched position and sag of the cord is obviated. Further this bar with the support can be displaced by pressing on the projecting part $n$ of the support, so that the roller is tilting in an inward direction.

By this arrangement a permanent stretching of the cord is secured. Further it is possible to journal either all shafts in a slidable manner or only one of them.

The amount of amusement can also be increased by the places of the guide rollers being made interchangeable and adjustably attached to the ground plate, so that these places can be displaced in any desired manner and it is thus made possible to alter the route of navigation at pleasure.

Instead of the represented trip of the Zeppelin any other navigation line of an aeroplane or the like can also be chosen. Further it is possible to execute the geographical map in bold relief for a better understanding.

What I claim is:

1. Aerial navigation toy for the purpose described comprising in combination a ground plate representing in a flat manner a geographical map, a number of objects on said map each representing a locality receiving in supports upwardly projecting shafts provided on the upper ends with guide rollers, a spring mechanism driving one of the said guide roller shafts, a cord running continuously around the said rollers and carrying an airship or the like.

2. Aerial navigation toy for the purpose described comprising in combination a ground plate representing a geographical map, a number of objects on said map each representing a locality shaped as buildings and receiving upwardly projecting shafts, a spring mechanism driving one of the said shafts, tiltably mounted supports for said shafts, a cord running continuously around the said guide rollers and carrying an airship or the like 3. Aerial navigation toy for the purpose described comprising in combination a ground plate representing a geographical map, a number of objects on said map each representing a locality arranged so as to be interchangeable and adjustable on the ground plate and receiving upwardly projecting shafts, a spring mechanism driving one of the said shafts, tiltably mounted supports for the said shafts, a cord running continuously around the said guide rollers and carrying an airship or the like.

In testimony whereof I affix my signature.

ERNST KEPPNER.